(12) United States Patent
McKee et al.

(10) Patent No.: US 6,915,135 B1
(45) Date of Patent: Jul. 5, 2005

(54) METHOD AND SYSTEM FOR DETECTING OBJECT PRESENCE AND ITS DURATION IN A GIVEN AREA

(75) Inventors: Philip R. McKee, Frisco, TX (US); Eric J. Moeller, Plano, TX (US); Fredrick L. Bauer, Colleyville, TX (US)

(73) Assignee: Praxis Technology Group, Inc., Dallas, TX (US)

( * ) Notice: Subject to any disclaimer, the term of this patent is extended or adjusted under 35 U.S.C. 154(b) by 544 days.

(21) Appl. No.: 09/858,265

(22) Filed: May 15, 2001

(51) Int. Cl.[7] ............................................... H04Q 7/20
(52) U.S. Cl. ............................. 455/456.6; 340/539.13
(58) Field of Search ......................... 455/456.1, 456.5, 455/456.6; 340/539.11, 539.13, 573.1, 573.4; 342/450

(56) References Cited

U.S. PATENT DOCUMENTS

| | | | |
|---|---|---|---|
| 4,236,147 A | | 11/1980 | Calvin |
| 4,598,272 A | * | 7/1986 | Cox ....................... 340/825.49 |
| 4,612,535 A | | 9/1986 | Sequin et al. |
| 4,800,540 A | | 1/1989 | Annala |
| 4,868,544 A | | 9/1989 | Havens |
| 4,976,337 A | | 12/1990 | Trett |
| 5,250,789 A | | 10/1993 | Johnsen |
| 5,278,764 A | | 1/1994 | Iizuka et al. |
| 5,283,550 A | | 2/1994 | MacIntyre |
| 5,406,271 A | | 4/1995 | Sonnendorfer et al. |
| 5,458,123 A | * | 10/1995 | Unger ........................ 600/509 |
| 5,495,077 A | | 2/1996 | Miller et al. |
| 5,583,487 A | | 12/1996 | Ackerman et al. |
| 5,661,460 A | * | 8/1997 | Sallen et al. ............. 340/573.4 |
| 5,680,879 A | | 10/1997 | Sheih et al. |
| 5,793,309 A | | 8/1998 | Nellson |
| 5,818,346 A | | 10/1998 | Goodwin, III et al. |
| 5,821,513 A | | 10/1998 | O'Hagan et al. |
| 5,859,414 A | | 1/1999 | Grimes et al. |
| 5,877,698 A | | 3/1999 | Kusnier et al. |
| 5,900,801 A | | 5/1999 | Heagle et al. |
| 5,914,654 A | | 6/1999 | Smith |
| 5,917,425 A | * | 6/1999 | Crimmins et al. ...... 340/825.49 |
| 5,920,261 A | | 7/1999 | Hughes et al. |
| 5,929,848 A | | 7/1999 | Albukerk et al. |
| 5,939,974 A | | 8/1999 | Heagle et al. |
| 5,939,988 A | * | 8/1999 | Neyhart ................... 340/573.4 |
| 5,953,667 A | * | 9/1999 | Kauppi ....................... 455/440 |
| 6,032,127 A | | 2/2000 | Schkolnick et al. |
| 6,144,848 A | | 11/2000 | Walsh et al. |
| 6,333,690 B1 | * | 12/2001 | Nelson et al. ......... 340/539.21 |
| 6,415,155 B1 | * | 7/2002 | Koshima et al. ......... 455/456.1 |

OTHER PUBLICATIONS

Webpage, www.ti-RFID.com, "Texas Instruments Radio Frequency Identification Systems (RFID) Homepage" and site Index, 5 pages, 2000.

Webpage, www.KartSaver.com "Kart Saver Inc. Shopping Cart Technologies", 4 pages.

* cited by examiner

Primary Examiner—Nguyen T. Vo
Assistant Examiner—Nhan T. Le
(74) Attorney, Agent, or Firm—Baker Botts L.L.P.

(57) ABSTRACT

A system (10) for determining a presence, identity, and duration of presence in a given area of an object includes one or more mobile transmitters (12) that periodically send out a beacon signal. A node (14) includes a receiver (16) that receives a beacon signal whenever a mobile transmitter (12) is within a threshold range of the node (14). The node (14) includes a controller (18) that determines a signal strength of each received beacon signal. The controller (18) compares the signal strength of each received beacon signal to a reference signal strength associated with the threshold range in order to determine whether the mobile transmitter (12) was within the desired detection area of the node (14). A base unit (24) sorts received information packets for processing by a base computer (28) in order to determine what mobile transmitter (12) was at what node (14) and for how long.

18 Claims, 2 Drawing Sheets

METHOD AND SYSTEM FOR DETECTING OBJECT PRESENCE AND ITS DURATION IN A GIVEN AREA

TECHNICAL FIELD OF THE INVENTION

The present invention relates in general to detection and monitoring techniques and more particularly to a method and system for detecting object presence, identifying the object and determining its duration of presence in a given area.

BACKGROUND OF THE INVENTION

In many businesses, it is desirable to monitor the operation of the business. Systems used to monitor business operations include transaction tracking, such as point of sale (POS) systems. These systems capture and process information relating to the purchase itself, such as salesperson, item purchased, product price and time of purchase. However, these systems typically require a manual action, such as data entry or product scanning, to capture the data. In addition, these systems typically do not capture data relating to customer or employee movements within the business. Other systems are designed to monitor customer or employee movements within a business operation, such as security systems which record that an identified employee was at a specific location at a specific time. However, these systems typically require a manual action, such as the use of a passkey or the entry of a code to record employee presence, and are thereby limited in their application to businesses where requiring a manual action by the employee to record presence is desirable. Other systems are designed to unobtrusively monitor customer or employee movements within a business operation, such as video cameras and associated video displays. However, gathering customer or employee movement information through the use of video cameras requires someone to sit in front of a video display and watch the business operate. This results in inefficiencies in time and manpower. In businesses where knowledge of customer or object movement is desirable, video cameras do not provide sufficient information related to business operation in that there is no technique to determine quantitatively how effective employees in the business are performing their tasks and whether they are effectively working in their assigned areas. A video camera implementation also has the limitation of requiring line of sight operation in order to effectively provide a monitoring capability. Moreover, privacy issues come into play through the use of video camera surveillance. Object identification systems, such as Radio Frequency Identification (RFID) systems, are utilized in warehouse inventory tracking applications, automobile toll-tag systems and other commercial applications to identify object presence. However, these systems require significant electrical energy to operate and are limited in their ability to accurately discern proximity. Accordingly, they are limited in their application and effectiveness. Other systems are designed to capture and quantify specific customer or object presence and movement through the transmission of ultrasound or infrared signals. However, these systems are limited in their effectiveness because ultrasound and infrared signals require line of sight access between the transmitter and receiver. Therefore, it is desirable to unobtrusively, economically and efficiently, and without the limitations of line of sight access, quantify customer or object movement in a business in order to improve the operation of the business.

SUMMARY OF THE INVENTION

From the foregoing, it may be appreciated by those skilled in the art that a need has arisen to unobtrusively determine presence of an object, identify the object and determine its duration of presence within a given area. In accordance with the present invention, a method and system for unobtrusively determining presence of an object in a given area, identifying the object and determining its duration of presence, are provided that substantially eliminate or greatly reduce disadvantages and problems associated with conventional monitoring techniques.

According to an embodiment of the present invention, there is provided a system for detecting the presence of an object within a given area, determining its identity and also determining its duration of presence in the given area. The system includes a mobile radio frequency transmitter to periodically send a beacon signal at predictable time intervals. The beacon signal includes a unique identification code. A radio frequency node receiver receives and processes the beacon signal when the mobile transmitter is within a desired threshold range of the node receiver. The node receiver keeps track of a number of beacon signals it receives from the mobile transmitter to determine a length of time that the mobile transmitter was within the desired threshold range of the node receiver. A node transmitter combines the information gathered from the mobile transmitter with information pertaining to the node itself, such as node identity, and sends it to a base unit for processing by an associated base computer.

The present invention provides various technical advantages over conventional monitoring techniques. For example, one technical advantage is to unobtrusively determine object identity and presence, and its duration of presence, in a given area without the requirement of line of sight access. Another technical advantage is the use of inexpensive, lightweight, and easy to install mobile transmitters, node receivers, and node transmitters for object identification, presence detection and duration of presence determination that can operate on battery power for long periods of time. Yet another technical advantage is the behavior information which is extrapolated from data pertaining to the presence of an identified object and its duration of presence in a given area. Still another technical advantage is to utilize low power radio frequency transmission techniques in an effective manner. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, in which.

DETAILED DESCRIPTION OF THE INVENTION

Figure 1:
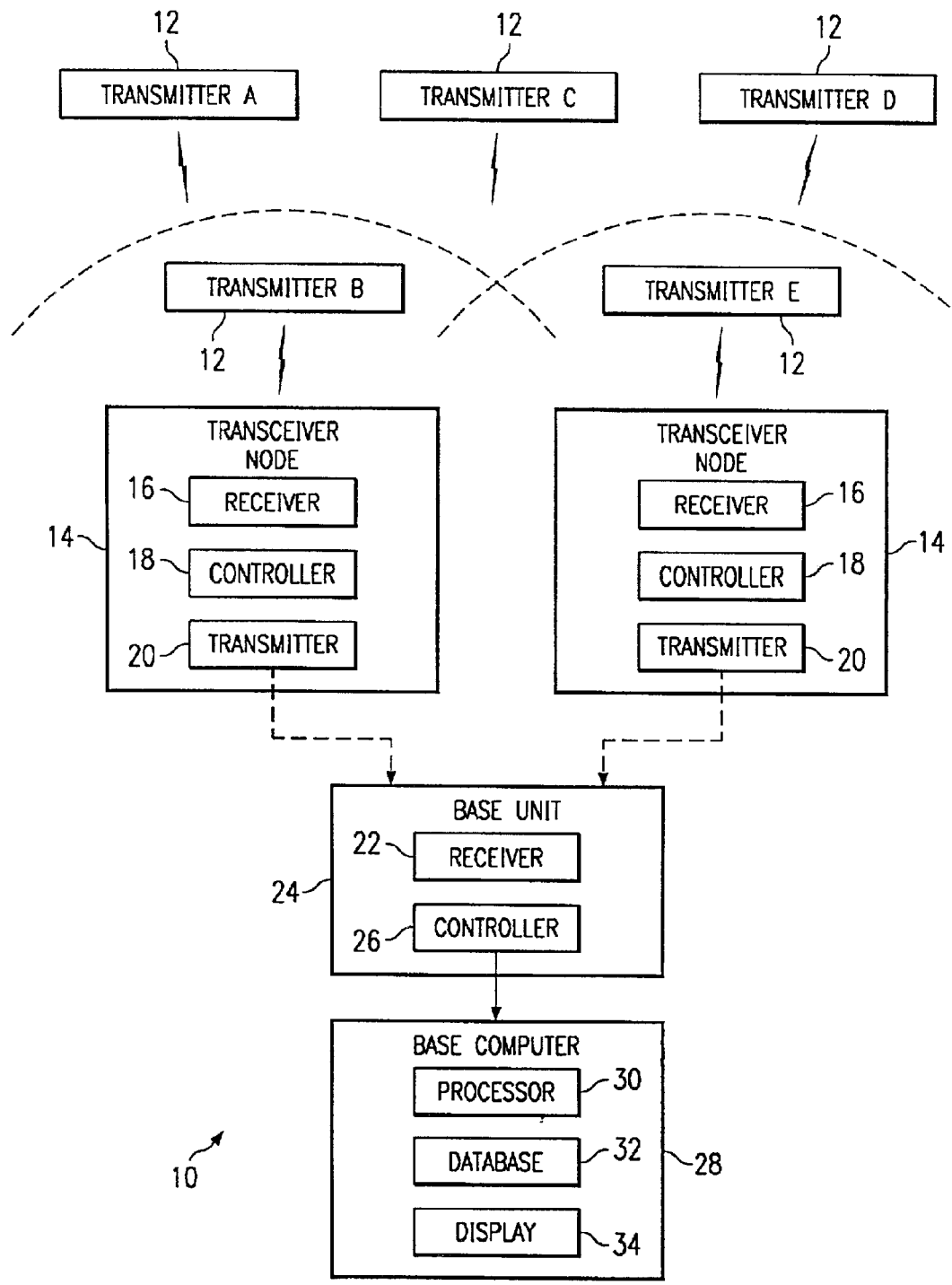
FIG. 1 illustrates a simplified block diagram of a system for detecting a presence of an object and its duration within a given area.

FIG. 1 is a block diagram of a system 10 for detecting a presence of an object and its duration in a given area. System 10 may include one or more mobile transmitters 12 that are capable of periodically transmitting a beacon signal. A beacon signal for a particular mobile transmitter 12 includes a unique identification code that makes it different from any other beacon signal transmitted by other mobile transmitters 12 within a particular environment or system installation. Preferably, the beacon signal transmitted by mobile transmitter 12 is a short burst transmission of one or more data packets that include the unique identification code. Mobile transmitter 12 preferably transmits the beacon signal every second of time, though other periodic transmission lengths may be used as desired. The beacon signal is preferably transmitted using radio frequency transmission techniques to eliminate line of sight requirements. The transmission power and/or frequency of mobile transmitter 12 may be adjusted as desired for a particular application. Mobile transmitter 12 is preferably a small battery operated device that can operate for a long period of time without battery replacement due to the low power, short range, and short transmission burst employed for the beacon signal. Mobile transmitter 12 may be placed on an object or person to be tracked.

System 10 also includes one or more nodes 14. Each node 14 includes a receiver 16 that can receive the beacon signal from mobile transmitters 12 when mobile transmitters 12 are within a desired threshold range of node 14.

Radio frequency receivers only capture valid signals sent from radio frequency transmitters that are properly matched and strong enough to be properly received and processed. That is to say that in general a valid signal sent from a radio frequency transmitter deteriorates as it travels from the transmitter towards an otherwise valid receiver to a point where it is too weak to be properly received and processed by that receiver. In most conditions where radio frequency communication is utilized, rapid signal attenuation would be considered a negative because it reduces the distance at which useful communication can occur. As one skilled in the art will readily realize, the theory underlying the process of radio frequency signal deterioration is based on the theory that radio frequency signals typically attenuate at a rate of approximately $1/r$ (where r refers to the distance between the transmitting and receiving antennas, not including absorption and scattering effects). At certain wavelengths and r distances, attenuation occurs at a rate of $1/r^2$ and under unique conditions even at $1/r^3$. Because maximizing the distance at which useful communication can occur is typically desirable, radio frequency communication systems are typically designed to operate under conditions where the radio frequency signal., attenuates at a rate of $1/r$. In the present invention, the area around node 14 where it is desired to detect the beacon signal is the distance between the transmitting and receiving antennas at which attenuation occurs at or near a rate of $1/r^3$ for the frequency which is being transmitted by mobile transmitter 12. It is this rapidly attenuating signal that is received and identified by transceiver node 14. In a preferred embodiment of the present invention, mobile transmitter 12 utilizes a low power (such as 1 MilliWatt or less) narrow band (such as 15 KiloHertz) Frequency Modulation (FM) data transmitter to transmit a 27 MegaHertz signal only a few feet before it attenuates to a level that it is no longer recognized by receiver 16.

Node 14 may further identify a signal strength of the beacon signal, thereby providing a high degree of precision in determining the relative proximity of the mobile transmitter 12 to the node 14. Node 14 includes a controller 18 that determines a signal strength of the received beacon signal and processes the unique identification code of the beacon signal. Controller 18 may compare a signal strength of a received beacon signal to a reference signal strength associated with the desired threshold range in order to determine the presence of a mobile transmitter 12 at a node 14. In a preferred embodiment, controller 18 selectively discards received beacon signals which are received with a signal strength less than the predetermined threshold level. The unique identification code is then placed into an information packet which also includes the determined signal strength. Node 14 includes a transmitter 20 that transmits the information packet along with an identity of node 14 to a receiver 22 at a base unit 24. Base unit 24 includes a controller 26 that sorts information packets received from node 14 for processing by a base computer 28.

Base computer 28 analyzes the information packets at a processor 30. Base computer 28 includes a database 32 for storing information packets and may include a display 34 for visually providing the information packets and the analyzed results to an operator of base computer 28. Base computer 28 processes how close a particular mobile transmitter 12 was to a particular node 14 based on the determined signal strength and for how long based on a number of beacon signals received over a certain period of time. In this manner, behavior information may be extrapolated from processing the signal strength and number of beacon signals occurring within a given area. Base computer 28 may include analytic software modules to perform this behavior extrapolation in order to provide direction or instruction information suggesting real time or future adjustments to any behavior patterns gleaned from the receipt of beacon signals. Base computer 28 may provide such information through transmission of control messages to base unit 24 and nodes 14 or to a point accessible by carriers of mobile transmitters 12 using a transmitter 39. For example, control messages may be sent to a local area pager carried by a person to provide an indication of a problem in the business operation that requires an immediate real time solution. Further, base computer 28 may provide control messages to nodes 14 for activation and deactivation as well as adjustments to the desired threshold receiving range of each node 14.

The transmission link between mobile transmitters 12 and node 14, as mentioned above, is a relatively short range radio frequency link. The transmission link between node 14 and base unit 24 can span over a greater distance and may employ wireless, wireline, or fiber optic carriers as desired. This transmission link may or may not be a line of sight implementation in a similar manner as discussed above with respect to transmission of the beacon signal and may be any viable technique for transmitting information. For ease of installation, this transmission link is preferably a moderate range radio frequency link in order that base unit 24 not be constrained in its location with respect to nodes 14. The transmission range of this transmission link is at a distance that still allows for node 14 to operate using a standard battery for an extended period of time, preferably for many number of weeks. Further, the frequency used for the transmission link between nodes 14 and base unit 24 is different than that used in the inventive transmission link between mobile units 12 and nodes 14. Base computer 28 may be a part of or separated from base unit 24. The transmission link between base unit 24 and base computer 28 may take any viable form of transmission techniques as discussed above.

Figure 2:
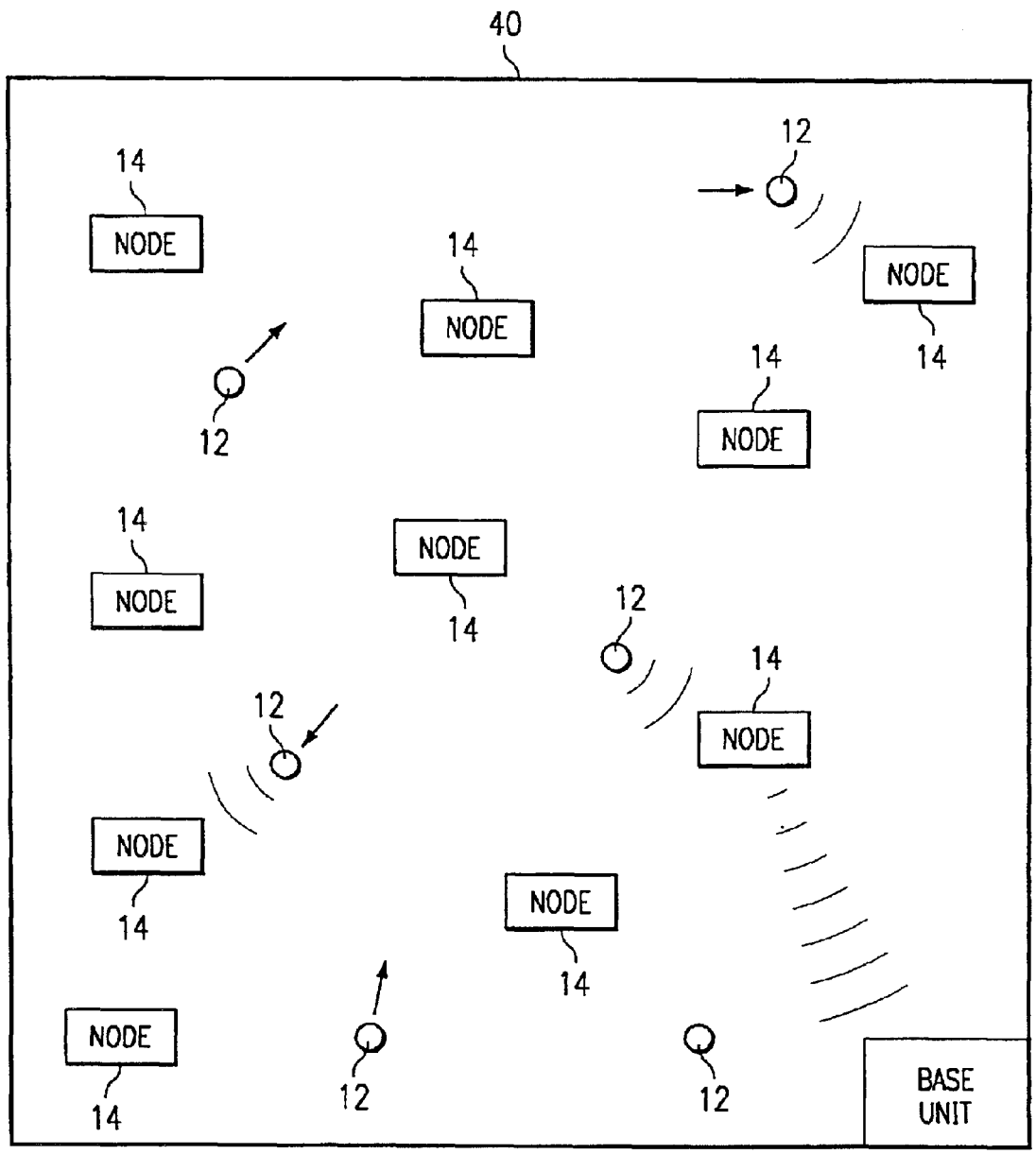
FIG. 2 illustrates use of the system within a business.

FIG. 2 shows the use of system 10 within a business location 40. Node 14 is placed in any location for which it is desirable to track the presence and duration of a mobile transmitter 12 that enters the threshold range of receiver 16 in node 14. The threshold range of receiver 16 may be programmably adjusted for different applications of system 10. Node 14 is also a small, lightweight, and battery operated device that can operate for extended periods of time without changing the battery power due to the brief nature of its transmissions to base unit 24. Node 14 may periodically send information packets to base unit 24, send information packets to base unit 24 in response to detecting a mobile transmitter 12 within the desired threshold range, or send information packets to base unit 24 in response to a triggering event as in a polling request from base unit 24. Node 14 may include the functionality of base unit 24 and/or base computer 28. Alternatively, information may remain in node 14 until there is a desire to process it. Base unit 24 may also communicate with node 14, preferably utilizing the same frequency and same receiver as is used by mobile transmitter 12.

For example, node 14 may operate in an echo mode or a transaction mode. In an echo mode, for each beacon signal received from a mobile transmitter 12, node 14 will send an information packet to base unit 24. The information packet may include the identity of the mobile transmitter 12, the identity of the node 14 if the implementation has multiple nodes, and the signal strength of the received beacon signal if so detected by node 14. Base unit 24 may time stamp the information packet received from node 14 in order to assist in determining a duration that mobile transmitter 12 was within the threshold range of node 14. In a transaction mode, node 14 may send an initial information packet to base unit 24 upon receipt of an initial beacon signal from mobile transmitter 12 and a final information packet to base unit 24 upon determining that mobile transmitter 12 is no longer within the threshold range of node 14. The final information packet may include the identity of mobile transmitter 12 and node 14 as well as a number of beacon signals received and, if desired, a signal strength of each beacon signal received. Node 14 may also send intermediate information packets to inform base unit 24 that mobile transmitter 12 remains within the threshold range of node 14. Node 14 may determine that a mobile transmitter 12 is no longer within the threshold range by determining that a beacon signal has not been received after a certain number of periods in relation to the periodic transfer of the beacon signal. In this manner, node 14 may miss receipt of a beacon signal due to some sort of interference without affecting the detected duration that mobile transmitter 12 stays within the threshold range. Node 14 may extrapolate the beacon signal not received from surrounding beacon signals that were received. The transmission of information packets from node 14 to base unit 24 is not necessary in implementations where the functions of base unit 24 and/or base computer 28 are incorporated into node 14.

Base computer 28 is capable of analyzing each mobile transmitter 12 in business location 40 in relation to each node 14 therein to determine the behavior of mobile transmitters 12 and nodes 14. Behavior of a particular mobile transmitter 12 can be determined and analyzed with respect to all or multiple nodes 14 within business location 40 or with respect to a particular node 14 in business location 40. Also, behavior with respect to a particular node 14 may be determined and analyzed in relation to a particular mobile transmitter 12 or all or multiple mobile transmitters 12 within business location 40. These various behavior characteristics that can be determined within business location 40 from presence of objects in particular areas, the specific proximity in relation to a particular node 14, and the duration of the presence are used to provide an indication of how the business is operating in order to adjust business operation as needed for improved effectiveness. Information concerning the presence, or non-presence, of one or more mobile transmitters 12 within one or more areas of business location 40, as well as duration and specific proximity, provide a valuable insight into the operation of a business that could not be previously captured by conventional monitoring techniques.

One example of an environment in which system 10 may be used is a restaurant. Each waiter may carry a mobile transmitter 12 that sends out its unique beacon signal. A node 14 may be placed at a table that is being serviced by the waiter. System 10 can be used to monitor the amount of service that is provided by the waiter to the table. Any time the waiter is within receiving range of the table, transceiver node 14 will receive the beacon signal and determine its signal strength. If the beacon signal is transmitted once per second, and only one beacon signal was received, it may mean that the waiter merely walked past the table. If the signal strength is too weak to indicate that the waiter was within the desired threshold range of the table, it may mean that the waiter was not servicing the table and may be servicing another table. If the waiter was servicing another table, then its node 14 would be receiving the beacon signal at a higher signal strength. Node 14 accumulates received beacon signals and their respective signal strengths for transmission to base unit 24 and processing by base computer 28. In this manner, a report detailing the waiter's attentiveness to a certain table can be generated to evaluate performance and restaurant operation. Furthermore, real time action may be provided by system 10 in response to identified behavior patterns that show inefficient business operation. For example, base computer 28 and base unit 24 may be employed to send out a control signal to the manager of the restaurant upon identifying that a certain table has not been serviced for a certain length of time in order rectify the situation.

System 10 may be similarly employed in a health care facility. Health care providers, such as nurses and doctors, may carry mobile transmitters 12 with nodes 14 being with a patient or at the patient's beds. In this manner, the attentiveness given to a particular patient may be tracked and the attention to patients being provided by a particular health care provider may be monitored. Also, the care given to a certain patient may be determined and quantified for analysis.

System 10 may also be used in a retail environment such as a grocery store or other mass merchant. Mobile transmitters 12 may be placed on shopping carts or baskets to track the shopping habits of the shoppers. Nodes 14 may be placed at certain displays or retail areas to track shoppers' presence at those areas. For example, a product manufacturer may have a display of its product set up in a grocery store. System 10 can reasonably ascertain whether the display draws shoppers' attention to the display and the displayed product by determining a presence of a mobile transmitter 12 carried on a cart or basket in the vicinity of a node 14 placed at the display and how long the mobile transmitter 12 was within the threshold range of the node 14 at the display. Information detailing a shopper's attentiveness to a particular display or other location in a grocery store may be beneficial in establishing product location, fees charged to manufacturers for displaying certain items, and other grocery store operating concerns.

Thus, it is apparent that there has been provided, in accordance with the present invention, a method and system for determining object presence in a given area, identifying the object and determining the duration of object presence that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A system for detecting a presence and its duration in a given area, comprising:
   a mobile transmitter operable to periodically send a beacon signal having an unique identification code;
   a node at a location within a given area, the node including a receiver operable to receive the beacon signal and the unique identification code from the mobile transmitter in response to the mobile transmitter being within a threshold distance of the node, wherein the node includes a transmitter operable to transmit an information signal to a base unit in response to receipt of the beacon signal, the information signal including information as to the unique identification code of the mobile transmitter and an identification code of the node;
   a base unit operable to receive the information signal from the node, the base unit operable to generate reports with respect to a presence and a duration of presence of the mobile transmitter within the threshold distance of the node in response to one or more information signals.

2. The system of claim 1, wherein the base unit includes a base computer operable to process the information signal and generate the reports.

3. A system for detecting a presence and its duration in a given area, comprising:
   a mobile transmitter operable to periodically send a beacon signal having an unique identification code;
   a node at a location within a given area, the node including a receiver operable to receive the beacon signal and the unique identification code from the mobile transmitter in response to the mobile transmitter being within a threshold distance of the node;
   wherein the beacon signal attenuates at a rate of $1/r^3$ within the desired threshold range, where r is a distance between the mobile transmitter and the node.

4. A method for detecting a presence of an object and its duration within a given area, comprising:
   receiving a beacon signal from a mobile transmitter, the beacon signal including a unique identification code;
   determining whether the beacon signal was transmitted within a desired threshold range determining whether additional beacon signals having the unique identification code were received from within the desired threshold range;
   determining how long a mobile transmitter was within the desired threshold range in response to a number of beacon signals received.

5. The method of claim 4, further comprising:
   discarding beacon signals received outside of the desired threshold range.

6. The method of claim 4, wherein the beacon signal attenuates at a rate of $1/r^3$ within the desired threshold range, where r is a distance of transmission from the mobile transmitter.

7. The method of claim 4, wherein beacon signals are periodically received when transmitted within the desired threshold range.

8. The method of claim 4, further comprising:
   transmitting the unique identification code, a signal strength for each beacon signal received, and a number of beacon signals received.

9. The method of claim 4, further comprising:
   determining a signal strength of the beacon signal.

10. A transceiver node for determining object presence and its duration in a given area, comprising:
    a receiver operable to receive a beacon signal from an object periodically transmitting beacon signals, the beacon signal including a unique identification code;
    a controller operable to determine whether the beacon signal was transmitted within a threshold range of the receiver, the controller operable to process additional beacon signals having the unique identification code and received from within the threshold range of the receiver for determination of an amount of time the object was within the desired threshold range.

11. The transceiver node of claim 10, further comprising:
    a transmitter operable to transmit an information packet, the information packet including the unique identification code, an identification code of the receiver, the signal strength of each received beacon signal, and a number of beacon signals received.

12. The transceiver node of claim 11, wherein the beacon signal is received and the information packet is transmitted at different frequencies.

13. The transceiver node of claim 10, wherein the desired threshold range is programmably adjustable.

14. The transceiver node of claim 10, wherein the beacon signal is transmitted by a radio frequency transmission technique.

15. A system for detecting a presence of an object and its duration within a given area, comprising:
    means for receiving a beacon signal, the beacon signal including a unique identification code;
    means for determining whether the beacon signal was transmitted within a desired threshold range in response to the signal strength;
    means for determining whether additional beacon signals having the unique identification code were received from within the desired threshold range;
    means for determining how long a mobile transmitter was within the desired threshold range in response to a number of beacon signals received.

16. The system of claim 15, further comprising:
    means for determining a signal strength of the beacon signal.

17. The system of claim 16, further comprising:
    means for transmitting the unique identification code and signal strength of each beacon signal received.

18. The system of claim 16, further comprising:
    means for determining a specific proximity of a sender of each beacon signal within the desired threshold range in response to the signal strength.

* * * * *